(12) United States Patent  
Watson

(10) Patent No.: US 8,764,512 B1  
(45) Date of Patent: Jul. 1, 2014

(54) INNER COVER FOR BEE HIVE

(76) Inventor: James L. Watson, Hingham, MA (US)

(*) Notice: Subject to any disclaimer, the term of this patent is extended or adjusted under 35 U.S.C. 154(b) by 629 days.

(21) Appl. No.: 12/760,037

(22) Filed: Apr. 14, 2010

Related U.S. Application Data

(60) Provisional application No. 61/169,123, filed on Apr. 14, 2009.

(51) Int. Cl.
*A01K 47/06* (2006.01)
*A01K 53/00* (2006.01)

(52) U.S. Cl.
USPC .................. 449/6; 449/9; 449/15; 449/20

(58) Field of Classification Search
USPC ............................ 449/6, 9, 11, 13, 15, 20, 48
See application file for complete search history.

(56) References Cited

U.S. PATENT DOCUMENTS

| 80,138 A | * | 7/1868 | Chase ............................... 449/6 |
| 1,607,659 A | | 11/1926 | Will |
| 2,525,251 A | * | 10/1950 | Willard ........................... 449/17 |
| 2,530,801 A | | 11/1950 | Babcock |
| 2,680,058 A | | 11/1952 | Baumgartner |
| 2,654,900 A | | 11/1953 | Kelley |
| 4,094,026 A | * | 6/1978 | Simoni ............................. 449/6 |
| 4,135,265 A | | 1/1979 | Van de Kerkof |
| 4,483,031 A | | 11/1984 | Shaparew |
| 4,512,050 A | | 4/1985 | Jamison |
| 6,579,147 B1 | | 6/2003 | De Young |
| 6,647,676 B1 | * | 11/2003 | Hansen et al. ................. 52/200 |
| 7,686,672 B2 | | 3/2010 | Katsampis |
| 2009/0068926 A1 | * | 3/2009 | Venglar ............................ 449/6 |

* cited by examiner

*Primary Examiner* — Rob Swiatek

(57) ABSTRACT

A permanent full year inner cover having a transparent base and a central channel for improved ventilation and with ventilation ports that can be used as an additional entrance. A modification of the central channel to allow for an exteriorly controlled bee escape mechanism. An additional enclosure over the central channel to allow for the feeding of sugar syrup. The safety feature of the capabilities to observe, monitor, and feed bees without the removal of the inner cover and the necessity of protective clothing.

10 Claims, 2 Drawing Sheets

INNER COVER FOR BEE HIVE

CROSS-REFERENCE TO RELATED APPLICATIONS

This application claims the benefit of provisional patent application Ser. No. 61/169,123, filed 2009 Apr. 14 by the present inventor.

FEDERALLY SPONSORED RESEARCH

Not Applicable

SEQUENCE LISTING OR PROGRAM

Not Applicable

BACKGROUND

1. Field of Invention
This invention relates to inner covers for bee hives.
2. Prior Art
The present invention relates to improvements to the inner cover above the top most box that hold the movable frames which comprise the interior of a bee hive. Conventional brood chambers generally have an inner cover which is generally made of an opaque material such as wood or a combination of wood and masonite or it is sometimes made entirely of molded plastic. This inner cover has a central opening for ventilation and raised frame on its top and bottom edge to allow for bee space inside the hive and ventilation to the outside through a small notch cut in the rear of the top cover assembly. This top cover is in turn enclosed by a telescoping outer cover which serves to keep out the rain and protect the hive from the elements. The traditional inner cover served an important function in that without its use it would be impossible to free a telescoping cover if that was all that was used and the bees had glued it tightly to the top of the brood chamber box. Indeed this seems to be the major reason for its use in that its ventilation capabilities were limited by the size of small notch and the sometime use of spacers to augment ventilation. Also due to the opaque materials of construction it was difficult to assess the condition of the hive without removing the inner cover and thereby disrupting the bees.

Accordingly, an object of the present invention is to provide an inner cover that addresses the need to be cognizant of the condition within the hive at any given time and additionally the need for proper ventilation of the hive.

Many examples of observation hives exist but they are typically a thin upstanding box with a generally vertical observation window providing a view of a colony of honey bees living and working within the box. It is difficult to maintain a permanent colony of honey bees in an observation hive, and the observation hive is generally constructed only to observe the honey bee life cycle. The present invention is meant to be a permanent part of a working bee hive and while it may not afford a view of the bees activity on the comb itself, it nevertheless allows the beekeeper to readily assess the condition of the hive without any disruption of the bees activity.

Resistance to the acceptance of a transparent inner cover may come from the mistaken belief that the bees will make an excessive amount of bun comb between the underside of the top covers surface and the top frames of the hive, such does not seem to be borne out by extensive testing of the device.

Another explanation for the lack of prior art in regard to the present invention is perhaps the belief that the incidental light from a transparent top inner cover might be detrimental to the bees development, again this does not seem to be the case.

SUMMARY

In accordance with one embodiment, the present invention is directed to a novel device that will allow a beekeeper to safely view the bee activity on the top frames within a bee hive by the use of a transparent inner cover and without the use of protective gear. The beekeeper will be able to assess bee population growth and the number of frames of comb occupied by bees which is very important during build up of colonies during springtime, it being crucial to know when to add additional space to prevent swarming.

Another embodiment of the invention is to aid feeding and monitoring the hive through the introduction of access holes through the base of the transparent sheet.

Another embodiment of the invention is to aid in the removal of moisture from the hive through added ventilation capabilities made possible by the partially enclosed vented central channel.

Another embodiment of the invention is to allow for the safe controlled removal of bees from honey supers during harvest time.

Yet another embodiment of the invention is to provide an entrance for the bees during the late winter and early spring through the ventilation access ports and the ability to monitor the number of flights occurring during that time.

A further object of the invention is to provide for a method of feeding bees sugar syrup through the addition of an enclosure for the opening of the central ventilation channel.

The invention, both as to its organization and method of operation, together with further features and advantages thereof will best be understood with reference to the following specification taken in connection with the accompanying drawings.

DRAWINGS

Figures

Figure 1:
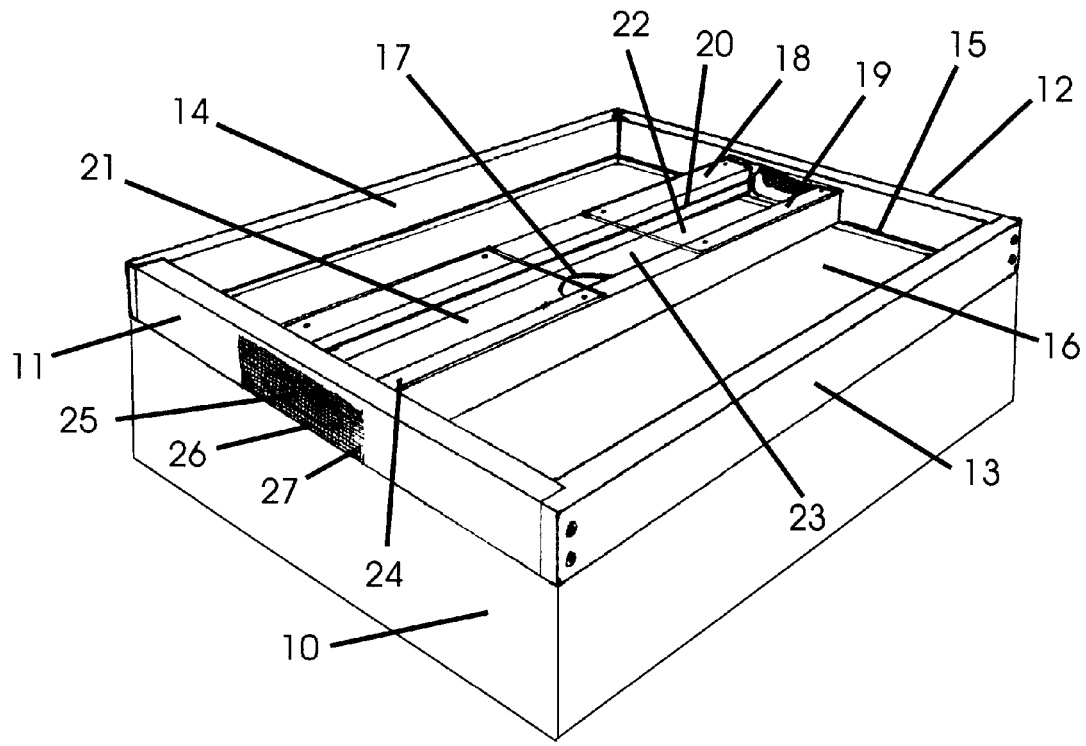
FIG. 1 shows an inner cover atop a typical hive body in accordance with and embodying the principles of the present invention.

| DRAWINGS-Reference Numerals | | | |
|---|---|---|---|
| 10 | hive body | 11 | front framework piece |
| 12 | rear framework piece | 13 | side framework piece |
| 14 | side framework piece | 15 | framework groove cut |
| 16 | transparent sheet | 17 | circular hole interior opening |
| 18 | cross member piece | 19 | cross member piece |
| 20 | channel groove | 21 | transparent sheet |
| 22 | transparent sheet | 23 | channel opening |
| 24 | nail fasteners | 25 | exterior channel opening |
| 26 | screen mesh | 27 | staple fasteners |
| 28 | interior channel screen mesh | 29 | end interior mesh opening |
| 30 | end interior mesh opening | 31 | central interior mesh opening |
| 32 | screen mesh enclosure | 33 | top cross support member |

-continued

DRAWINGS-Reference Numerals

| | | | |
|---|---|---|---|
| 34 | top cross support member | 35 | side support member |
| 36 | side support member | 37 | side of traverse cross member |

DETAILED DESCRIPTION

FIG. 1—Preferred Embodiment

One embodiment of the inner cover is illustrated in FIG. 1 in a perspective view of the inner cover which is placed above the top of a hive body 10. It comprises of a rectangular framework of the same dimensions of the hive body shell. It comprises of front 11 and rear framework piece 12 of ¾ by 1¾ by 15¼ inches dimension and side framework pieces 13, 14 of ¾ by 1¾ by 20 inches dimension that are joined at the corners by ¼ inch rabbit joints which in this case are fastened by screws and also glued. Each piece has a 3/32 inch wide and ¼ inch deep groove 15 cut ⅛ inch up from the bottom edge of the frame pieces to accommodate a rigid sheet of either glass or plastic transparent material 16 of approximately 3/32 inch thickness which is imbedded in a bed of sealant material and forms the base of the top cover structure. This placement of the rigid sheet allows the transparent base to be raised in relation to the framework to a depth to allow for additional breathing room and the passage of bees across the top frames of the bee hive. A sealant such as Phenoseal™ acts both as water seal and also provides structural integrity. This sheet has a 2⅛ inch centered circular hole 17 which allows air movement from the interior of the hive. In other embodiments this central hole may be of a different shape such as square, rectangular or oval. This transparent material which forms the base of the inner cover may be made of a heat formed plastic material which may be molded around the bottom of the framework and attached thereupon in such a manner that an adequate distance is maintained between the interior bee frames and the bottom of the transparent sheet. Additionally the framework may be composed of plastic or molded into the plastic framework itself.

In another embodiment the rectangular framework may also be fitted with two cross members 18, 19 of the dimension ¾ by 1⅛ by 18½ inches that are parallel to each other and spaced 3 inches apart and are placed centrally on the surface of the transparent surface on either side of the central hole and going from front to back of the enclosing framework. These cross members are attached to the end pieces by means of glue and fasteners and are fastened and sealed on their base surface to the transparent surface by means of a silicone sealant such as Phenoseal™. These cross members also have a centered ⅛ inch wide groove 20 of ¼ inch depth running the entire length and facing each other in the channel thus made by the parallel cross members.

The channel is covered on either end by the same rigid transparent sheet material 21, 22 as the cover's base such that there remains an opening 23 of approximately 4 inches wide in the central portion of the channel. They are fastened by means of small nails 24 such that they may be removed for future maintenance.

The end pieces have an exterior channel opening 25 cut into them that is centered and has the approximate dimensions of ⅝ inch by 3 inches such that it is located between the channel created by the cross members and are fitted with a screen mesh 26 on the outside surface that is attached by means of staples 27.

Operation—FIG. 1

The manner of using the inner cover illustrated by FIG. 1 is by placing it over the topmost hive body box of a bee hive. Thus placed one can observe bee activity through the transparent material which comprises the base of the inner cover without the necessity of removing the traditional inner cover. In addition to the ability to view the interior of the hive, for those using an interior feeding device consisting of a sugar reservoir built into the space of a single frame commonly called a "division board feeder", the filling of that reservoir may be accomplished by drilling a small hole into the transparent base of the inner cover and the insertion a funnel to fill the reservoir. Thus the reservoir may be filled without the danger of overfilling and it may be done without having to remove the inner cover. Additional holes may be drilled as needed through the transparent base for both feeding purposes and the insertion of monitoring devices such as thermometers, moisture, and $CO_2$ meters, in that placement of such devices is aided by the ability to see the position of the frames within the hive.

In the ideal configuration for the inner cover device an additional box would be placed on top of the inner cover and then the traditional telescoping cover on top of that to provide additional air chamber for the dissipation of moisture generated from within the hive.

Ventilation is provided by the central opening 17 and is improved by the channel created by the central cross members which allow air flow across the central opening and thereby facilitating removal of moisture from within the hive.

Air is drawn from the inside of the hive in the case that if there is a positive air flow into the openings 25 at either end of the central channel, whether transversally from one opening to the other or in both openings and thence upward through the main central opening at the top of the channel then air is sucked out of the hive by the Bernoulli principle.

In another embodiment especially during warm days of late winter and early spring when the bees tend to occupy the top most portion of the hive bodies and are often desirous of cleansing flights it may be beneficial to have another bee entrance, this can be accomplished by peeling back the screen mesh 26 from the ventilation port 25 and allowing the bees access to the outside. Depending on the proclivity of the beekeeper, this entrance may be made permanent by the addition of a small alighting board attached to the bottommost portion of the ventilation port.

In another embodiment it can be envisioned that an additional transverse channel intersecting the main channel can be utilized with its accompanying ventilation ports by notching the base of the central channel members to gain access to the transverse channel yet not effect the structural integrity of the central channel members.

The main opening 23 above the inner hole 17 to the interior of the hive can be fitted with either the same transparent material or with screening material to prohibit bees from entering the chamber above the inner cover. With this arrangement there is no danger that an errant bee might inadvertently sting an observer who may wish to examine the hives activity. In general practice such the obstruction is unnecessary in that with sufficient depth of an additional hive body the bees do not seen to be concerned with the appearance of a casual observer. Indeed with access to this additional space the bees discourage the establishment of ant colonies and others that might encroach on their space.

Notwithstanding the advantages of using an additional hive body to provide breathing space, the inner cover may be used with non telescoping outer covers placed directly over the inner cover and even the telescoping kind may be used provided there is sufficient space so as not to completely block the air inlet ports 25. The inner cover should be constructed with sufficient sealant that even if it were exposed to the weather as in the case that the outer cover blew off due to wind, it would act as a reservoir to protect the interior of the hive from water damage. If such a contingency were anticipated the introduction of a weep hole could be employed such that if a hole made below the level of the interior cross members then water would not flow through the top opening 23 above the inner hole 17 and thence into the hive. The groove cut in the cross member pieces may be employed to hold cross pieces such that when two are employed then they act as a rest for an inverted quart container of sugar water with holes punched in its top that is a common method used to feed bees.

The reader may note that although one embodiment as presented in FIG. 1 is constructed of wood and a glass or plastic transparent material, other more economical means of construction are available. One such method would be to construct the central channel from molded or thermal formed plastic and heat seal or glue it to the transparent base. Another method would be to form the channel by use of a rectangular tube shape attached to the top portion of the transparent sheet and then machine the central openings. Another method would be to form the channel by folding the sheet of transparent plastic such that an inverted open channel is created which can be closed by the addition of a of a strip of the same material attached to the underside area adjacent to the channel opening sides by means of thermal sealing or glue. Such construction would be more amenable for use on "nuc boxes" (smaller hives of half the size of a standard hived used for the production of replacement bees) due to the lower cost and that the entrance provided by access to the ventilation port would be all that was required and beneficial to observe the bees activity relative to number and frequency of cleansing flights.

Figure 2:
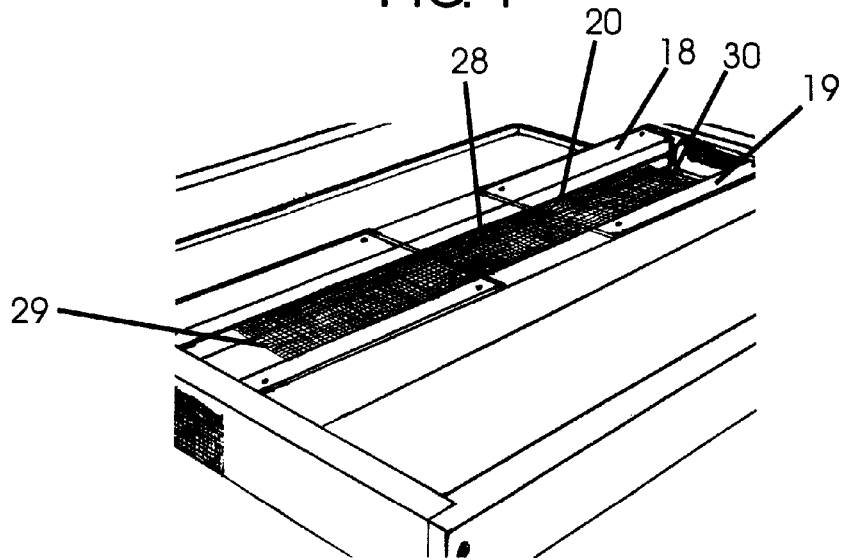
FIG. 2 shows a similar inner cover with more detail of the inner covers central channel in accordance with an another embodiment of the present invention.
Figure 3:
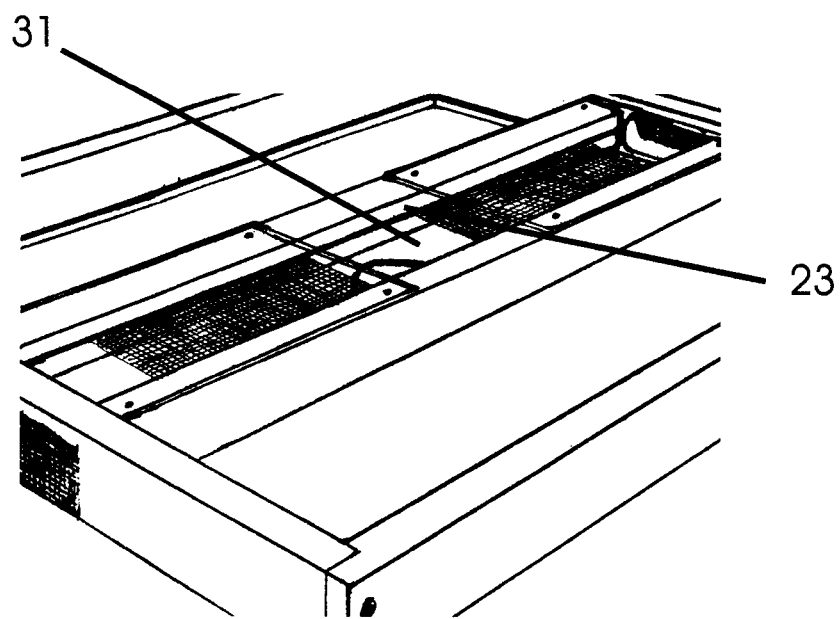
FIG. 3 shows a similar inner cover with more detail of the inner covers central channel in accordance with an another embodiment of the present invention.
Figure 4:
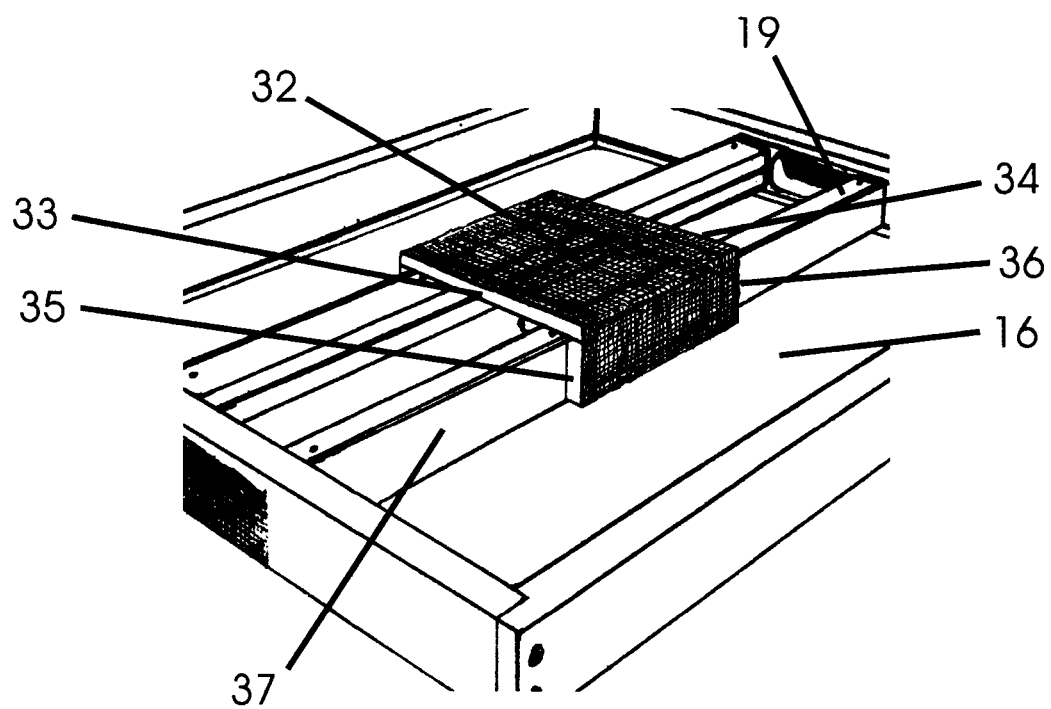
FIG. 4 shows a similar inner cover with more detail of the inner covers central channel in accordance with an another embodiment of the present invention.

FIGS. 2-4 Additional Embodiments

FIG. 2 is a more detailed perspective view that shows an additional embodiment with the placement of a screen 28 in the channel created by the parallel transverse support members 18, 19. The sides of the screen material are placed into the groove 20 and extend to within an inch of the end of the channel on either end and therefore providing interior end openings 29 and 30.

FIG. 3 is a more detailed perspective view that shows an additional embodiment with the placement of the screen 28 in the channel created by the parallel transverse support members but with an opening 31 under the main opening 23 of approximately the same dimensions or slightly less.

FIG. 4 is a more detailed perspective view that shows an additional embodiment with the placement of a screen mesh enclosure 32 over channel opening 23 and interior opening 17. This screen covers the top portion of the opening and extends downward to the top of the transparent base 16 of the inner cover. It is supported by top cross members 33 and 34 which raise it up a distance of ⅜ on an inch and by side support members 35 and 36 which maintain the same distance along the side 37 of the transverse cross members 19.

Operation—FIGS. 2-4

In operation the inner cover as illustrated in FIG. 2 is fitted with a screen in the central ventilation channel such that it extends to within a short distance (approximately one inch) of the end and is used as a device to clear bees from one hive body to another, what is commonly referred to as a "bee escape". In principle, if a movable frame with a number of bees attached to the frame is removed from within the hive and then placed above the inner cover device, then the bees that are on the frame will move down through the screen apparatus into the main part of the hive. When they attempt to return upward they are not able since they attempt to take the shortest route and are stopped by the screen and do not seem to be cognizant of the way they descended and soon give up the effort. This device can be used with individual frames or with an entire box inhabited with bees. In operation it is beneficial to cover the two transparent covers 21, 22 of the central channel with an opaque material such as a sheet of black plastic attached by means of tape or mechanically attached by fasteners.

In operation FIG. 3 is an additional embodiment that is a modification of the "bee escape" function in that there is an opening in the screen such that the bees have access to the upper area of the top cover assembly. Such access is useful if the bees are left with frames of wax that honey has been extracted from and they are employed to clean the remaining honey from the frames or they need access to feed from slotted bags of sugar water put on the top cover side area on either side of the central ventilation channel. This opening may be closed at will by the use of a piece of screen material cut slightly longer than the opening provided for the bee's access. This screen material can be placed directly over the opening or if slight runners are attached beneath the central groove then the piece of screen material may be slid aside by the use of wires attached to either end of the closure screen and running to the outside of the hive through the ventilation openings 25 of the central channel. It is thus possible to open and close the access path without coming in contact with the bees that may be in a hive box located on top of the inner cover. A single closure wire may be employed provided that additional runners are used above the sliding screen to keep it in place.

In operation the inner cover as illustrated in FIG. 4 is fitted with a screen enclosure placed over the central ventilation channel such that the enclosure acts as a bee feeding device. Two reservoirs are created by the side and front members of the inner cover framework and the central ventilation channel cross members which during construction are made waterproof by the use of sealant. In operation either of the reservoirs is filled with sugar water or water and the bees have access to it by going up through the inner cover central ventilation hole and up and over the side of the central channel cross member and down the side which is enclosed by the screen material. The side of the screen enclosure leading down the side of the reservoir can be of another material other than screen provided that there is sufficient space at the bottom for the flow of the sugar solution. Additionally in the area created by the side screen and the side of the cross member channel wall a float may be used such that it will raise or fall with the level of the sugar water. This will reduce the mortality rate from bees drowning in the sugar solution contained in the screened reservoir. A reduction in the reservoir area may be accomplished by the introduction of a pair of cross members sealed to the transparent base and extending from the central cross members to the outside side framework. Also a plastic container with thin side walls can be introduced to fit under the side of the enclosure device that is fitted over the inner cover access area.

In another embodiment it is envisioned that the screen enclosure be constructed entirely of the screen material either through folding of the screen material or stamping of a move sturdy screen material. It is envisioned that the screen enclosure may also be formed from extruded or molded plastic.

CONCLUSION, RAMIFICATIONS, AND SCOPE

Accordingly, the reader will see that the inner covers of the various embodiments can be used to monitor the bee hive activity and allow for the introduction of monitoring devices and the replenishing of sugar reservoirs located within the hive with relative safety for the beekeeper. They also allow for improved air circulation and dissipation of moisture from within the beehive. Additional embodiments provide for the evacuation of bees from the honey supers during harvest and the ability to control the movement of bees relative to superimposed boxes above the inner cover. Additionally the beekeeper who uses a "safety" inner cover, (as in the embodiment that does not include a central ventilation hole) above the superimposed boxes will not be stung when he discovers that the bees have not evacuated the honey super chamber due to bees reluctance to leave hatching brood. Indeed even in one of its simplest embodiments the inner cover device may be made more safe for the beekeeper by taping a piece of screen over the central ventilation hole without seriously impairing its function. Additionally other embodiments provide a method of feeding bees sugar water during the times that this is beneficial. In a further embodiment the central ventilation access channel can be used as another bee entrance when this may be essential as during winter when the bees tend to occupy the topmost portion of the hive and are in need of cleansing flights.

While the above description contains many specificities, these should not be construed as limitations on the scope of any embodiment, but as exemplifications of the presently preferred embodiment thereof. Many other ramifications and variations are possible within the teachings of the various embodiments. For example, even in one of its simplest embodiment such as an inner cover with a central hole but without the benefit of a central ventilation channel, this embodiment could be useful provided there was a sufficient air cavity above the inner cover as could be accomplished by the addition of an empty hive body above the inner cover and the introduction of shims to elevate the telescoping outer cover for the dissipation of moisture. It may also be noted that construction of the device may be of molded plastic or a combination of thermal formed and extruded plastic to effect the shape of the base, framework, and channel of the various embodiments. Additionally it should be appreciated that the ability to monitor bee activity especially as it relates to access and egress through the enclosed central channel would be beneficial for its research capabilities especially if a gate mechanism were employed as one similar to a Portman bee escape.

Thus the scope of the invention should be determined by the appended claims and their legal equivalents, and not by the examples given.

I claim:

1. An inner cover for a bee hive of a type comprising a transparent base with a central hole enclosed by a rectangular framework of a predetermined dimension and said transparent base is raised a predetermined distance relative to said rectangular framework and a plurality of cross members within the framework that form a central channel, with said cross members providing structural support for said transparent base whereby the entire interior upper surface of said hive may be viewed.

2. The inner cover of claim 1 wherein said transparent base and said framework and said plurality of cross members within the framework that form a central channel are fabricated of molded plastic.

3. An inner cover for a bee hive of a type comprising a transparent base with a central hole enclosed by a rectangular framework of a predetermined dimension and said transparent base is raised a predetermined distance relative to said rectangular framework and with a plurality of cross members within the framework that form a central channel which is enclosed with the same transparent material as the base with the exception of an opening above said central hole of the transparent base and with a screened ventilation access port at each end of said channel whereby ventilation within the hive may be improved.

4. The inner cover of claim 3 wherein said opening of the central channel above said central hole of the transparent base is fitted with either the same transparent material as the base or with screening material.

5. The inner cover of claim 3 wherein said transparent base and framework and said plurality of cross members within the framework that form a central channel are constructed by the use of molded and or thermal formed plastic.

6. An inner cover for a bee hive of a type comprising a transparent base with a central hole enclosed by a rectangular framework of a predetermined dimension and said transparent base is raised a predetermined distance relative to said rectangular framework and with a plurality of cross members within the framework that form a central channel which is enclosed with the same transparent material as the base and with a screened ventilation access port at each end of said channel and with an opening above the said central hole of the transparent base and with screen material dividing horizontally said channel with the exception of near the ends whereby a bee escape mechanism is created.

7. The inner cover of claim 6 further including an additional central opening in the screen material dividing horizontally said channel.

8. An inner cover for a bee hive of a type comprising a transparent base with a central hole enclosed by a rectangular framework of a predetermined dimension and said transparent base is raised a predetermined distance relative to said rectangular framework and with a plurality of cross members within the framework that form a central channel which is enclosed with the same transparent material as the base and with a screened ventilation access port at each end of said channel and with an opening above said central hole of the transparent base and with screen material enclosing said channel opening and extending down to said transparent base at a predetermined distance from said channel opening and outside portion of said cross members sufficient to allow bee access whereby a bee feeding device is created.

9. The inner cover of claim 8 wherein said screen mesh enclosure enclosing said channel opening and extending down to said transparent base is made from extruded or molded plastic.

10. An inner cover for a bee hive of a type comprising a transparent base with a central hole enclosed by a rectangular framework of a predetermined dimension and said transparent base is raised a predetermined distance relative to said rectangular framework and with an access port at each end of said rectangular framework whereby bee entrances may be created, said access ports being located above said transparent base when in use.

* * * * *